United States Patent
Kojima et al.

(10) Patent No.: US 6,471,451 B2
(45) Date of Patent: Oct. 29, 2002

(54) METHOD OF CORRECTING THERMAL DISPLACEMENT OF MACHINE TOOL

(75) Inventors: Kunio Kojima, Yamanashi (JP); Susumu Maekawa, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/897,935

(22) Filed: Jul. 5, 2001

(65) Prior Publication Data

US 2002/0004688 A1 Jan. 10, 2002

(30) Foreign Application Priority Data

Jul. 6, 2000 (JP) ........................................ 2000-204570

(51) Int. Cl.⁷ .......................... B23Q 15/18; G05B 19/18
(52) U.S. Cl. ...................... 409/131; 318/471; 409/135; 700/175
(58) Field of Search ................................. 405/131, 132, 405/135, 134, 239; 700/177, 175; 318/473, 569, 568.24, 471; 33/520; 384/905

(56) References Cited

U.S. PATENT DOCUMENTS 3,579,073 A * 5/1971 Johnstone et al. .......... 318/473
4,413,422 A * 11/1983 Kitamura ...................... 33/520
4,471,443 A * 9/1984 Kinoshita et al. ........... 318/572
5,895,181 A * 4/1999 Ito et al. ...................... 409/132

FOREIGN PATENT DOCUMENTS

| JP | 8-215981 | * | 8/1996 | .................. 409/135 |
| JP | 11-197998 | * | 7/1999 | .................. 409/135 |

* cited by examiner

Primary Examiner—William Briggs
(74) Attorney, Agent, or Firm—Staas & Halsey LLP

(57) ABSTRACT

In a machine tool controlled by using a numerical control device, a correction amount is determined for thermal displacement due to heat generation and heat conduction in a spindle motor and a feed shaft motor, in addition to thermal displacement due to heat generated by rotation of a spindle and a feed shaft. A tool position is corrected based on the correction amount. An entire stroke of the feed shaft is divided into a finite number of sections, and for each section, a correction amount for thermal displacement due to axial movement of the feed shaft is determined. The tool position is corrected based on the determined correction amount.

10 Claims, 11 Drawing Sheets

EFFECT OF HEAT GENERATION IN A SPINDLE MOTOR
IS NOT CONSIDERED

EFFECT OF HEAT GENERATION IN A SPINDLE MOTOR
IS CONSIDERED

MEASUREMENT STARTED IMMEDIATELY AFTER POWER SOURCE ON

MEASUREMENT STARTED AFTER EFFECT OF EXCITATION OF MOTOR IS CANCELLED

BEFORE CORRECTION

AFTER CORRECTION

METHOD OF CORRECTING THERMAL DISPLACEMENT OF MACHINE TOOL

BACKGROUND OF THE INVENTION

1. Field of the Invention

The present invention relates to a method of correcting thermal displacement in a machine tool.

2. Description of the Related Art

In a machine tool, due to heat generated from a motor which drives a feed screw and a spindle, frictional heat caused by rotation of a bearing, and frictional heat at the joined portion of a ball screw and a ball nut, the feed screw and the spindle expand and the tool position is displaced. Namely, the relative positional relationship between the workpiece which is to be positioned and the tool becomes offset. This displacement of the tool position due to heat is problematic in cases where highly precise machining is to be carried out.

As means for eliminating displacement of a tool position due to heat, conventionally, methods have been used in which a cooling apparatus is provided, or an initial tension is imparted to the ball nut at the feed screw so as not to be influenced by an expansion due to heat, or in which a displacement sensor or a temperature sensor is provided and an instructed position is corrected based on the detected displacement or the detected temperature.

However, in the method in which an initial tension is imparted to the ball screw at the feed screw so as not to be influenced by an expansion due to heat and in the method in which a sensor is provided and the thermal displacement is corrected, there are problems concerning limits to the structure or position where a sensor is mounted, or problems in that means is needed to protect the sensor from coolant and chips for maintaining reliability of the sensor. Further, in a case where a sensor is provided, problems arise in that time is required for measurement, and as a result, the machining time increases, and displacement cannot be corrected at the time of start-up of the machining operation.

OBJECTS AND SUMMARY OF THE INVENTION

An object of the present invention is to provide a method of correcting thermal displacement in which thermal displacement can be corrected easily and at a low cost without the need for a sensor.

In a first embodiment of the present invention, in a machine tool which is controlled by using a numerical control device, a correction amount is determined for thermal displacement due to heat generated in a spindle motor and resultant heat conduction, in addition to thermal displacement due to heat generated by the rotation of a spindle. The tool position is corrected based on this correction amount.

The correcting method of the first embodiment comprises: a step of detecting a spindle speed and a load of a spindle motor; a step of determining an average spindle speed and an average spindle motor load based on the spindle speed and the load of the spindle motor; a step of determining an amount of thermal displacement of a spindle portion based on the average spindle speed and the average spindle motor load; and a step of, by using an amount for canceling the amount of thermal displacement of the spindle portion as correction amount, correcting a position instruction value of a feed shaft of the machine tool based on the correction amount.

As a method of determining a thermal displacement due to heat generation of the spindle and heat generation of the spindle motor, a computational formula for computing the thermal displacement from the rotational speed of the spindle and the load of the spindle motor is determined in advance. To correct the tool position at the time of actually driving the machine tool, the rotational speed of the spindle and the load of the spindle motor are monitored, and the monitored rotational speed of the spindle and load of the spindle motor are substituted into the computational formula, and a thermal displacement of a spindle and a thermal displacement due to heat generation of a spindle motor are determined, respectively. The determined thermal displacement of a spindle and thermal displacement due to heat generation of a spindle motor are added, and the sum is used as a spindle portion thermal displacement. An amount which cancels this spindle portion thermal displacement is determined as the correction amount, and the tool position is corrected based on the determined correction amount.

According to the above-described method of correcting thermal displacement of the first embodiment, not only the heat generated by the spindle rotating, but also, the heat generated by the spindle motor is considered as a cause of thermal displacement. Thus, even in a case where there is a high frequency of accelerating and decelerating such as in tapping and the amount of heat generated by the spindle motor is large, the thermal displacement of the spindle portion can be corrected accurately. Further, the spindle portion thermal displacement can be made to include not only the thermal displacement due to the amount of heat generated from the spindle and the spindle motor, but also, the thermal displacement due to the heat radiation and heat conduction caused in the tool portion.

In a second embodiment of the present invention, in a machine tool which is controlled by using a numerical control device, the entire stroke of the feed shaft is divided into a finite number of sections, and the thermal displacement of each section is used. For each of the sections obtained by dividing the entire stroke of the feed shaft into a finite number of sections, a correction amount for the thermal displacement due to axial movement of the feed shaft is determined, and based on the determined correction amount, the tool position is corrected.

The correction method of the second embodiment comprises: a step of dividing a range of movement of a feed shaft to set a plurality of sections; a step of detecting a position of the feed shaft; a step of determining an average moving speed at each section based on the detected position; a step of determining a thermal displacement at each section based on the average moving speed for each section; a step of adding the thermal displacement of each section from a reference position to a correction position, and using the sum as a feed shaft portion thermal displacement; a step of using the sum, which is obtained by adding the spindle portion thermal displacement to the feed shaft portion thermal displacement, as an overall thermal displacement at the correction position; and a step of using an amount, which cancels the overall thermal displacement, as a correction amount, and, in movement to the correction position of the feed shaft, effecting correction by adding the correction amount to a position instruction value of the feed shaft.

As a method of determining thermal displacement due to the feed shaft, a feed shaft displacement computational formula, whose parameter is the moving speed at each divisional section, is prepared.

To correct the tool position at the time of actually driving the machine tool, the position of the feed shaft is monitored, and the average moving speed of the feed shaft at each section from the monitored position is determined of each section. By substituting the determined average moving speed into the feed shaft thermal displacement computational formula, the thermal displacement is determined. By adding the thermal displacement of each section from the reference point to the correction position, the correction amount at the correction position is determined. Based on the determined correction amount, the tool position is corrected. Further, the computational formula may be a formula which includes thermal displacement due to heat radiation at each section and heat conduction from the adjacent section.

According to the above-described method of correcting thermal displacement of the second embodiment, for each of divisional sections obtained by dividing the entire stroke of the feed shaft, the effect of the generated heat at the section to which the feed screw has actually moved, and the effect of the generated heat transmitted by thermal conduction from the adjacent section, are estimated for each section. The thermal displacement for each section is added from the reference point to the correction position. Thus, accurate correction which does not depend on the position can be carried out. Further, by considering the effects of the spindle and the feed shaft, accurate correction can be carried out.

In a third embodiment of the present invention, in a machine tool which is controlled by using a numerical control device, in addition to the thermal displacement of the feed shaft, the thermal displacement due to the feed shaft motor is also considered. The feed shaft portion thermal displacement includes the displacement due to heat generation of the feed screw portion and the thermal displacement due to heat generated in the feed shaft motor. A correction amount for both thermal displacements is computed, and the position of the tool is corrected based on the correction amount.

According to the thermal displacement correction method of the third embodiment, in addition to the effects of heat generated in the feed shaft, the effects of heat generated in the feed shaft motor are considered, and accurate correction can be carried out.

In a fourth embodiment of the present invention, the results of correction are fed-back, and the thermal displacement computational formula is corrected. By using the thermal displacement determined in any of the above-described first through third embodiments and the displacement (correction error) determined from a deviation from an actual tool position, the heat generation factor included in the thermal displacement computational formula is corrected, and the correction error is corrected.

According to the thermal displacement correction method of the fourth embodiment, accurate correction can be carried out based on the actual driving state.

According to the method of correcting thermal displacement of the present invention, thermal displacement can be corrected simply and at a low cost, without the need for a sensor.

DETAILED DESCRIPTION OF THE PREFERRED

Embodiments

Figure 1:
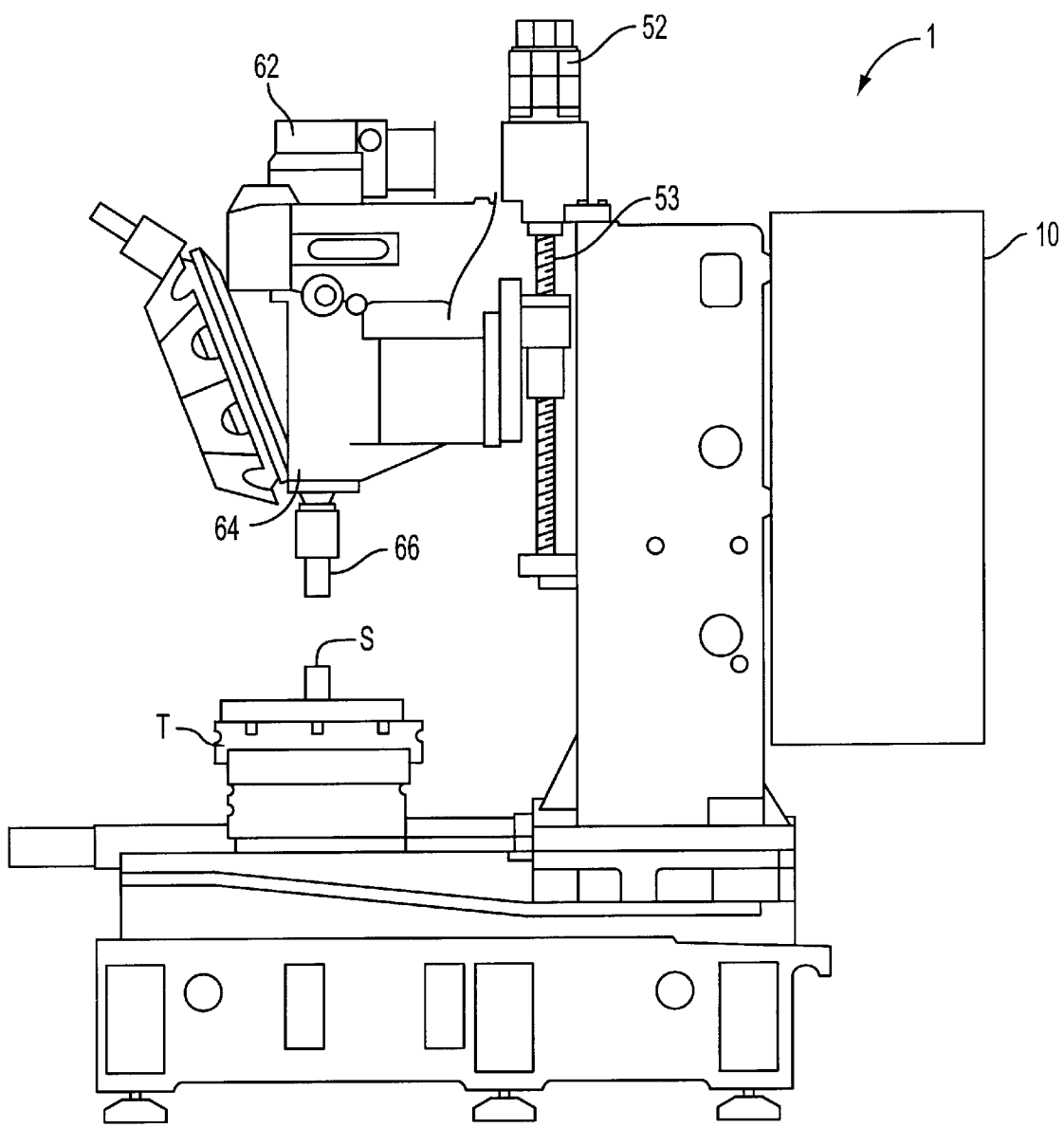
FIG. 1 is a schematic view of a vertical type drill press, as an example of a machine tool, to which the method of correcting thermal displacement of the present invention is applied.

FIG. 1 is a schematic view of a vertical type drill press 1 of a machine tool to which the present invention is applied.

In FIG. 1, reference numeral 62 is a spindle motor, 52 is a servo motor for a Z shaft which is a vertical feed shaft, 10 is a numerical control device (CNC) which serves as a control device for controlling the drill press, 64 is a spindle, and 66 is a tool mounted to a spindle 64B. The table T is moved in directions of an X shaft and a Y shaft, which are orthogonal to the Z shaft and perpendicular to one another, by unillustrated servo motors for the X shaft and Y shaft. The structure of the drill press 1 is no different than conventional structures, and thus, further explanation thereof will be omitted.

Figure 2:
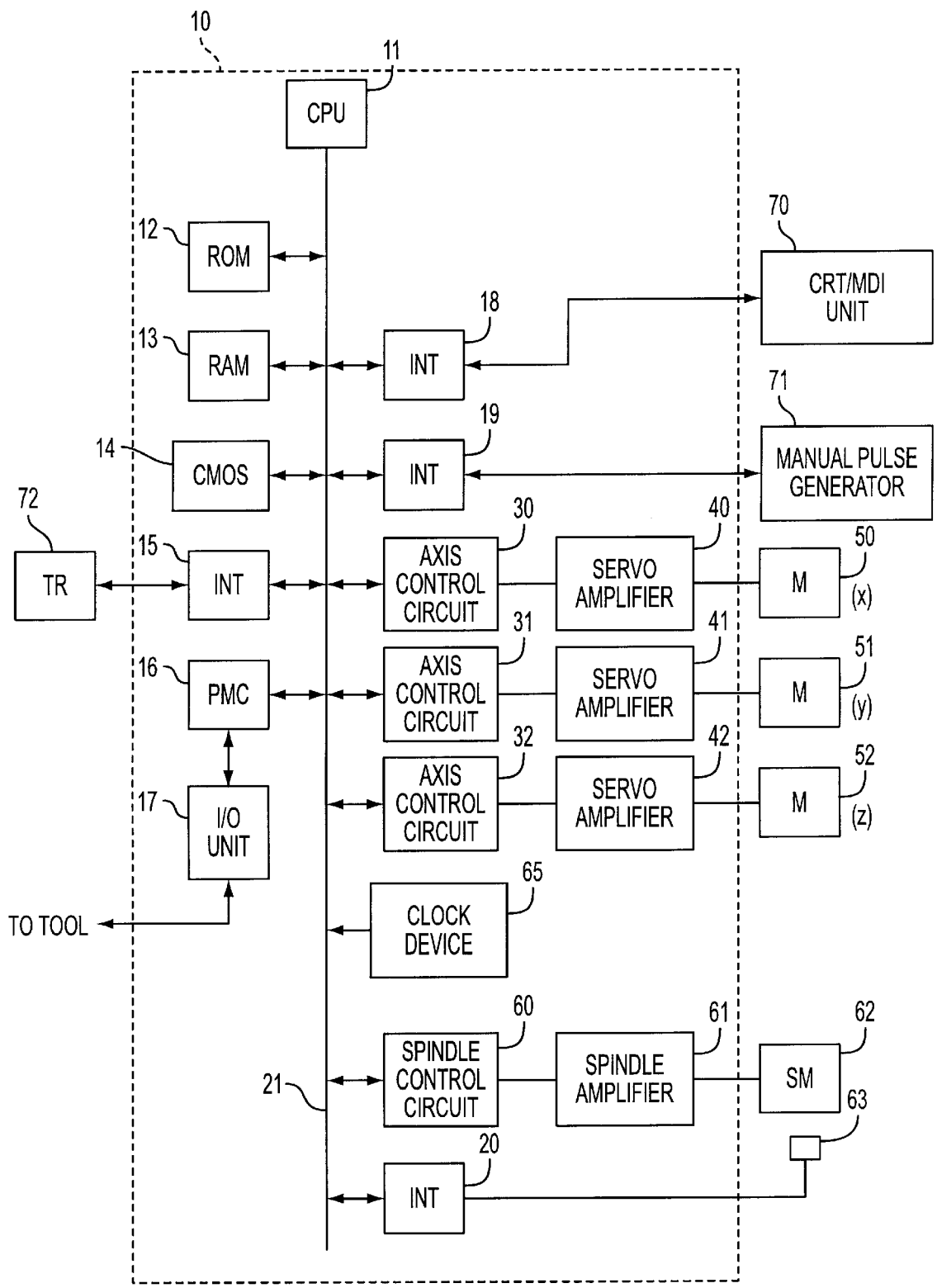
FIG. 2 is a functional block diagram showing main portions of a numerical control device of the drill press shown in FIG. 1.

FIG. 2 is a functional block-diagram showing main portions of the numerical control device 10 of the above-described drill press.

A processor 11 of the numerical control device 10 is a processor which overall controls the numerical control device 10. The processor 11 reads out, via a bus 21, a system program stored in a ROM 12, and controls the entire numerical control device 10 according to this system program. Temporary computation data, display data, respective types of data inputted by an operator via a CRT/MDI unit 70, and the like are stored in a RAM 13. A CMOS memory 14 is backed-up by a battery (not shown), and is structured as a non-volatile memory whose storage state is maintained even if the power source of the numerical control device 10 is turned off. A thermal displacement measurement program which will be described later, a correction amount update program, a machining program which will be described later and which is read via an interface 15, a machining program inputted via the CRT/MDI unit 70, and the like are stored in the CMOS memory 14. Further, various types of system programs for implementing processing for an editing mode which is needed in order to prepare and edit the machining program, and processing for automatic operation, are written in advance into the ROM 12.

The interface 15 is an interface for external equipment which can be connected to the numerical control device 10. An external equipment 72, such as a paper tape reader or a paper tape puncher and an external storage device or the like, is connected to the interface 15. A machining program, the thermal displacement measurement program which will be described later, and the like, are read from the paper tape reader or the external storage device, and a machining program, which has been edited in the numerical control device 10, can be outputted to the paper tape puncher or external storage device.

A programmable controller (PC) 16 controls auxiliary devices and the like at the drill press (machine tool) 1 side by a sequence program which is stored in the ROM 12 of the numerical control device 10. Namely, according to an M function, an S function, and a T function which are instructed by the machining program, the PC 16 converts, by these sequence programs, to signals needed at the auxiliary devices, and outputs them to the auxiliary devices through an I/O unit 17. The auxiliary devices, such as various types of actuators or the like, are operated by the output signals. Further, the PC 16 receives signals of various types of switches of an operation panel provided on the main body of the machine tool 1, and carries out the necessary processings, and transfers the results to the processor 11.

The current positions of the respective shafts of the drill press 1, alarms, parameters, and image signals such as image data and the like, are sent to the CRT/MDI unit 70, and are displayed on the display thereof. The CRT/MDI unit 70 is a manual data input device provided with a display and a keyboard and the like. An interface 18 receives data from the keyboard of the CRT/MDI unit 70, and transfers the data to the processor 11. An interface 19 is connected to a manual pulse generator 71, and receives pulses from the manual pulse generator 71. The manual pulse generator 71 is mounted to the operation panel of the drill press 1, and is used for accurately positioning movable portions of the machine tool 1 by control of the respective shafts by distributed pulses based on manual operation.

Axis control circuits 30–32 of the X, Y and Z axes, which move the table T of the drill press 1, receive instructions for movement of the respective shafts from the processor 11, and output instructions for the respective axes to servo amplifiers 40–42. The servo amplifiers 40–42 receive these instructions, and drive servo motors 50–52 of the respective shafts of the drill press 1. An encoder for position detection is included in each of the servo motors 50–52 of the respective shafts, and the position signal from the encoder is fed-back as a pulse train. Depending on the case, a linear scale may be used as the position detector. Further, by F/V (voltage/frequency) converting the pulse train, a speed signal can be generated. In FIG. 2, explanation of the feedback of the position signal and the speed feed back is omitted.

A spindle control circuit 60, upon receiving a spindle rotation instruction to the drill press 1, outputs a spindle speed signal to a spindle amplifier 61. The spindle amplifier 61, upon receiving the spindle speed signal, rotates the spindle motor 62 of the drill press 1 at an instructed rotational speed, so as to drive the tool. The spindle motor 62 is connected to a position coder 63 by a gear or a belt. The position coder 63 outputs feedback pulses synchronously with the rotation of the spindle 64, and the feedback pulses are read by the processor 11 via an interface 20. 65 is a clock device which is adjusted so as to be synchronous with the current time. Further, a displacement measuring apparatus (detection switch) S, which is mounted to the table T of the drill press 1 when thermal displacement data which will be described later is obtained, is connected to the I/O unit 17, and the ON/OFF state thereof can be confirmed by the processor 11 via the PC 16. The displacement measuring apparatus, which can be positioned at any height, detects contact from the direction of Z axis of the distal end operation surface of the tool 66. As needed, a displacement measuring apparatus which detects contact from the direction of X axis of the outer peripheral operation surface of the tool 66, and a displacement measuring apparatus which detects contact from the direction of Y axis of the outer peripheral operation surface of the tool 66 can also be provided.

Figure 3A:
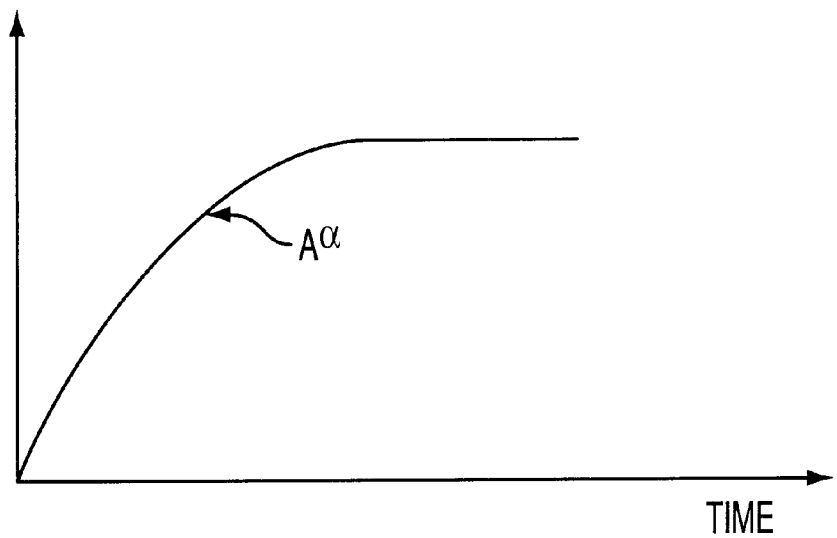
FIG. 3A is a diagram showing extension of a spindle and respective shafts due to heat generation at the time when the machine tool begins machining to drive the spindle and feed shaft.

FIG. 3A is a diagram of a thermal displacement curve showing the state of extension of the spindle and each shaft due to heat generated when the machine starts machining to drive the spindle and the feed shaft. FIG. 3A shows that the spindle and the feed shaft expand suddenly due to heat generation at an initial stage, and thereafter, as the amount of heat radiation comes near the amount of heat generation, the increase in the expansion becomes dull.

Figure 3B:
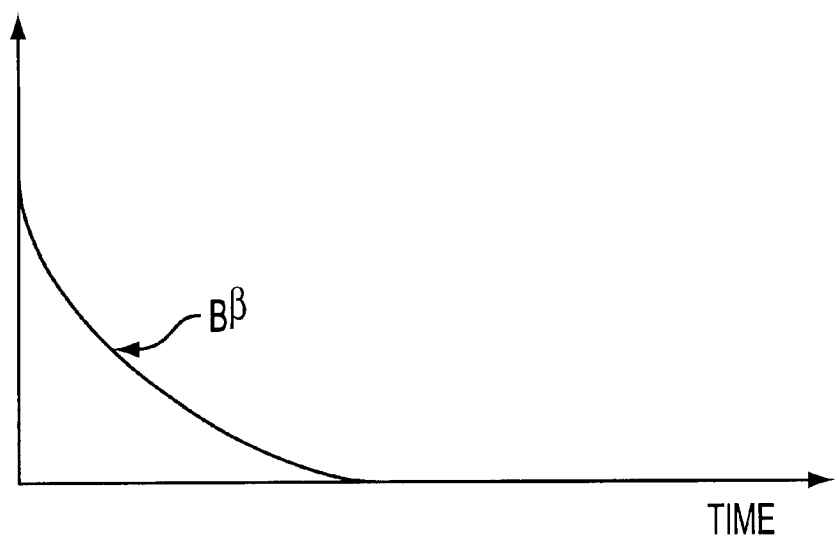
FIG. 3B is a diagram showing contraction of the spindle and respective shafts due to heat radiation at the time driving of the machine tool is stopped.

On the other hand, FIG. 3B is a diagram of a thermal displacement curve showing the state of contraction of the spindle and the respective shafts due to heat radiation at the time when driving of the machine tool is stopped. FIG. 3B shows that when the machining is stopped and the movement stops, the spindle and the respective shafts contract due to heat radiation.

In the present invention, the thermal displacement curve of the spindle and the feed shaft due to heat generation and heat radiation is measured by experimentally driving the machine tool, and based on the measured thermal displacement curves, a computational formula for the thermal displacement is determined, and the computational formula is stored. When the machine tool is driven, the instructed position is corrected based on the computational formula for the thermal displacement.

First, a first embodiment of the present invention will be described.

In the present embodiment, thermal displacement, which arises from heat generation due to rotation of the spindle and from heat generation due to conduction of the heat generated by driving the spindle motor, is determined. In this case, as the thermal displacement of the spindle is expressed as a positional displacement of the Z axis, the thermal displacement of the spindle is determined by measuring the positional displacement of the Z axis.

In the measurement of the thermal displacement, the spindle motor is rotated at a predetermined rotational speed, and each time a predetermined interval of time passes, the height of the displacement measuring apparatus is adjusted, and the distal end operation surface of the tool is made to contact from the direction of Z axis, and the thermal displacement of the spindle is thereby measured. As for the measurement data, a plurality of types of data can be determined by changing the rotational speed of the spindle motor or changing the mounted tool or the like.

The computational formula for estimating the thermal displacement of the spindle is following formula (1). By monitoring the rotational speed of the spindle from the measured data, formula (1) is established.

$$\delta_n = \delta_{n-1} + A1_n + B1_n + C_{n-1} \tag{1}$$

wherein $$C_n = C_{n-1} + A2_n - B2_n - \delta_{n-1} \quad (2)$$

Here, with n as the sampling time, $\delta_n$: extension of entire spindle portion (spindle portion thermal displacement);

$A1_n$: extension of spindle due to heat generation per unit time;

$B1_n$: contraction of spindle due to heat radiation per unit time;

$C_n$: displacement due to heat conduction from spindle motor;

$A2_n$: extension of spindle motor due to heat generation, from sampling time i to next sampling time i+1;

$B2_n$: contraction of spindle motor due to heat radiation, from sampling time i to next sampling time i+1.

$A1_n$ in the above formula (1) is expressed by the following formula by using formula $f1(S_n)$ expressing the average spindle rotational speed.

$$A1_n = K1 \cdot \{f1(S_n)\}^{\alpha 1} \quad (3)$$

This formula (3) corresponds to expressing the thermal displacement curve shown in FIG. 3A as $A^\alpha$. It should be noted that, in the above formula (3), k1 and α1 are coefficients. Further, given that N is the total number of data in a unit time period and Si (i=1 through N) is the spindle rotational speed, $f1(S_n)$ is $$f1(S_n) = (S1 + S2 + \ldots + Si + \ldots + SN)/N.$$

$A2_n$ in the above formula (1) is expressed by the following equation by using the equation $f2(L_n)$ expressing the average spindle motor load $L_n$.

$$A2_n = K2 \cdot \{f2(L_n)\}^{\alpha 2} \quad (4)$$

It should be noted that, in the above formula (4), k2 and α2 are coefficients. Further, given that N is the total number of data in a unit time period and Li (i=1 through N) is the spindle motor load, $f2(L_n)$ is $$f2(L_n) = (L1 + \ldots + Li + \ldots + LN)/N.$$

$B1_n$ and $B2_n$ in the above equation (1) correspond to expressing the thermal displacement curve illustrated in FIG. 3B as $B^\beta$, and are expressed by the following formulas.

$$B1_n = k3 \cdot \delta_{n-1}^{\alpha 3} \quad (5)$$

$$B2_n = k4 \cdot \delta_{n-1}^{\alpha 4} \quad (6)$$

Here, α3, α4, k3, k4 are coefficients.

The above coefficients α1, α2, α3, α4, k1, k2, k3, k4 can respectively be determined by the method of least squares so as to approximate the thermal displacement curve by measured data.

In the above equation (1), the spindle portion thermal displacement ($\delta_n$) is expressed by using the spindle average rotational speed $S_n$ and the spindle average motor load $L_n$ as parameters. In this way, in the present embodiment, as the spindle portion thermal displacement ($\delta_n$) is determined from the spindle average rotational speed ($S_n$) and the spindle average motor load ($L_n$) the effects of variations over time in the spindle speed and the motor load can be eliminated. It should be noted that the load of the spindle motor can be determined by a load meter.

Figure 4A:
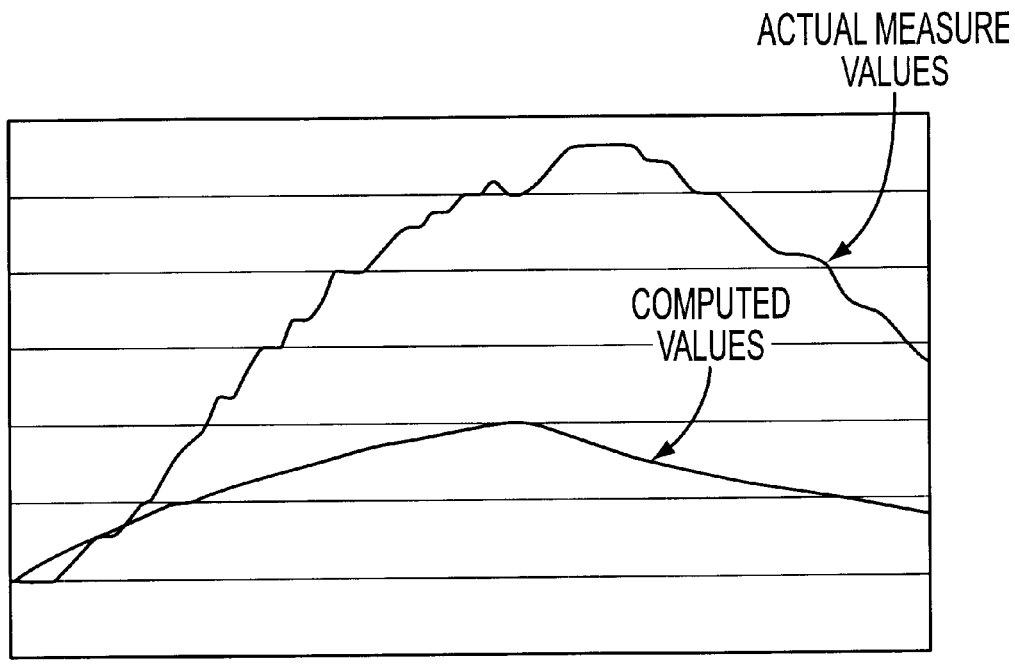
FIG. 4 is a diagram showing an example of thermal displacement correction according to a second embodiment of the present invention.
Figure 4B:
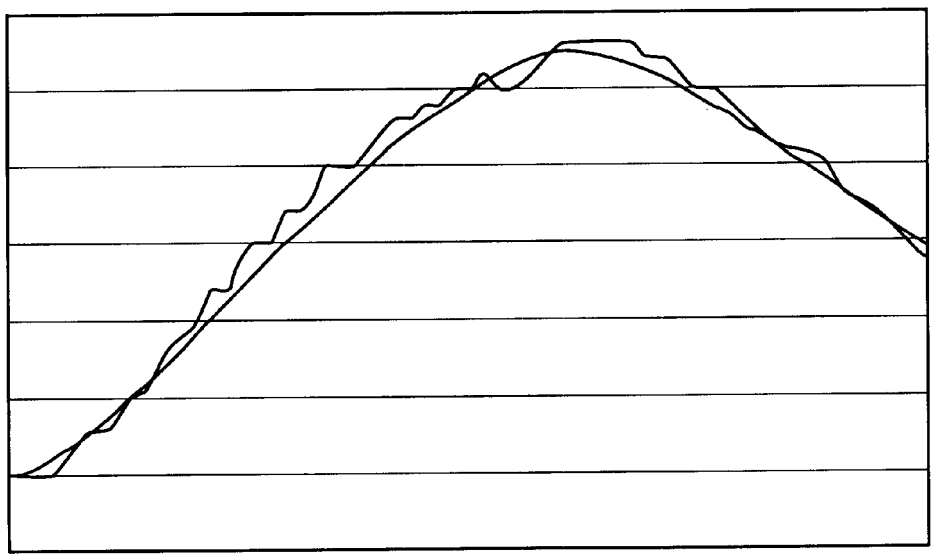

FIG. 4 is an example of thermal displacement correction for the spindle and the spindle motor. In FIG. 4, (a) is a case where effects due to heat generated by the spindle motor are not considered, and compares the thermal displacement correction values for heat generated in the spindle, with actual measured values, while (b) is a case where the effects of heat generated in the spindle motor are considered, and compares, with actual measured values, the thermal displacement correction for heat generated in the spindle, as well as the thermal displacement correction for heat generated in the spindle motor. From FIG. 4, it can be seen that a substantially accurate approximation can be obtained by taking into consideration the effects of the heat generated in the spindle motor.

Next, a second embodiment of the present invention will be described.

In the present embodiment, the entire stroke of the feed shaft is divided into a finite number of sections, and thermal displacement correction for the feed shafts is carried out by using the thermal displacement for each of the divisional sections.

Figure 5:
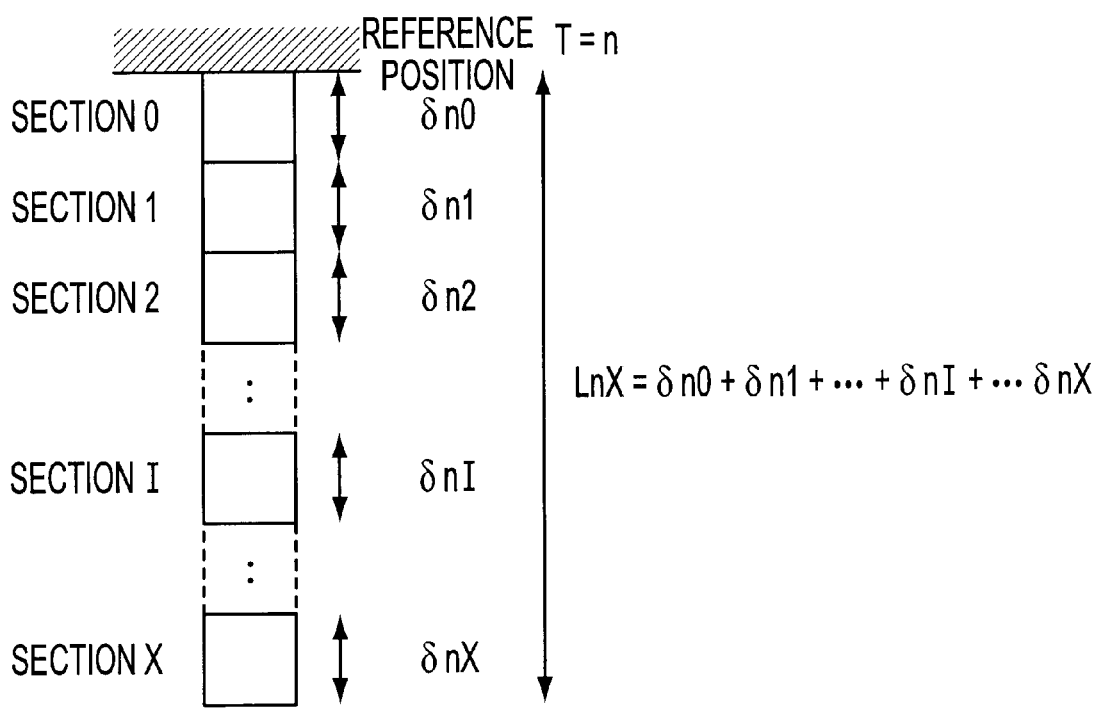
FIG. 5 is a diagram for explaining divisional sections of the feed shaft.

FIG. 5 is a schematic diagram for explaining the divisional sections of the feed shaft. In FIG. 5, the entire stroke of the feed shaft is divided into X+1 sections, from a section 0 (a section adjacent to a reference position) to a section X (the section the furthest from the reference position).

The thermal displacement $\delta_{nI}$ of a section I at a time n is expressed by the following equation.

$$\delta_{nI} = \delta_{(n-1)I} + A3_{nI} - B3_{nI} + D_{nI} \quad (8)$$

wherein $$D_{nI} = k5 \cdot \{\delta_{(n-1)I+1} + \delta_{(n-1)I-1} - 2 \cdot \delta_{(n-1)I}\} \quad (9)$$

Here, with n as the sampling time, $\delta_{nI}$: thermal displacement of section I $A3_{nI}$: extension of section I per unit time due to heat generated in a feed shaft $B3_{nI}$: contraction of section I per unit time due to heat radiated in the feed shaft $D_{nI}$: displacement due to heat conduction from the section adjacent to section I.

Here, by using equation $f3(v_{nI})$ expressing the average moving speed of the feed shaft at the section I, $A3_{nI}$ in the above equation (8) is expressed by:

$$A3_{nI} = K6 \cdot \{f3(v_{nI})\}^{\alpha 5} \quad (10)$$

Further, considering that the contraction of section I due to heat radiated in the feed shaft per unit time and the contraction due to heat radiation to an open air are expressed by a thermal displacement curve $B^\beta$, shown in FIG. 3B, the contraction $B3_{nI}$ of the feed shaft due to heat radiation per unit time is expressed by the following formula.

$$B3_n = k7 \cdot \delta_{n-1}^{\alpha 6} \quad (11)$$

It should be noted that α5, α6, k5, k6, k7 are coefficients.

As described above, in the present embodiment, the thermal displacement for each section obtained by dividing the movement range of the feed shaft is expressed by using the average moving speed of the feed shaft as a parameter. When thermal displacement correction is carried out, the position for each section of the feed shaft is detected, the average moving speed is determined from the changes of the positions, and the determined average moving speed is applied to the computational formula.

When the entire stroke is divided into a finite number of (X) sections, the thermal displacement (feed shaft thermal displacement) $L_{nX}$ at a position X which arises from thermal displacement of the feed shaft is expressed by the following formula by adding the thermal displacement for each section I from the reference position until the position X.

$$L_{nX}=\delta_{n0}+\delta_{n1}+\ldots+\delta_{nI}+\ldots+\delta_{nX} \quad (12)$$

Figure 6:
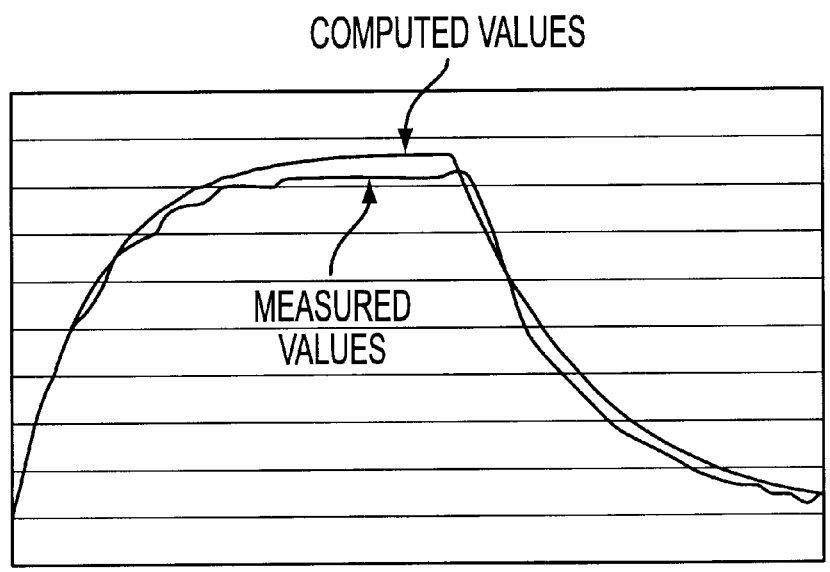
FIG. 6 is a diagram showing an example of thermal displacement correction according to the second embodiment of the present invention.

FIG. 6 shows a comparison of a thermal displacement at Z=−100 mm in a case where the feed shaft is actually fed fast or fed for cutting operation, with the results obtained by computing, using equations (8) and (12), the thermal displacement for each 1 second (unit time) by sampling positions of the feed shaft each 8 milliseconds. FIG. 6 shows that a substantially accurate approximation is achieved.

Figure 7:
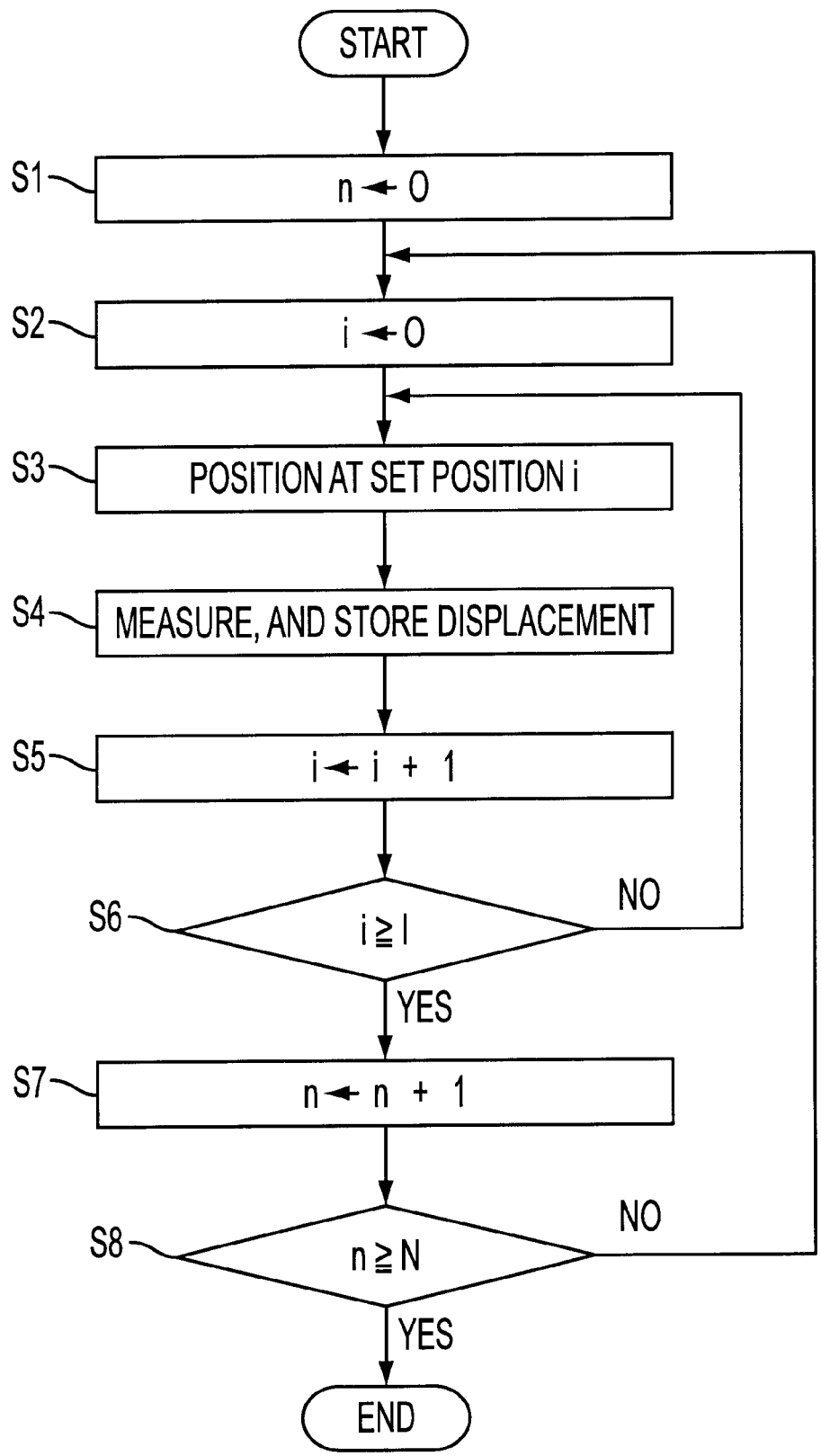
FIG. 7 is a flowchart showing processes of measurement of a thermal displacement of the feed shaft.

The measurement of the thermal displacement of the feed shaft can be carried out by, for example, the processes shown in the flowchart of FIG. 7.

First, the displacement measuring apparatus S, whose height can be adjusted, is mounted on the table T, and the tool (an end mill or the like) 66, whose distal end is flat, is mounted on the spindle 64. A displacement measurement program is stored in the non-volatile memory 14 via the interface 15. The entire stroke of the Z axis for obtaining the thermal displacement data, the number I of divisions, the number of times measurement is carried out, and the like are set from the CRT/MDI unit 70, and an execution of the thermal displacement measurement program is instructed.

When an instruction to execute the thermal displacement measurement program is inputted, the processor 11 starts the processing shown in FIG. 7. First, a counter n which counts the number of times of measurement is set to "0" (step S1), and a counter I, which sets one of the sections obtained by dividing the entire stroke of the feed shaft is set, to "0" (step S2).

The X and Y axes are driven so that the position of the table T is adjusted, and the position of the displacement measuring apparatus S with respect to the spindle is determined. Thereafter, the position of the displacement measuring apparatus S is adjusted to a height of a set section i (step S3). The position of the set section i is measured by the displacement measuring apparatus S (step S4). "1" is added to the counter i and the section is changed to the next set section i (step S5). The processings of steps S3, 4, 5 are repeated until the counter i becomes "I". In this way, positional data for all of the divisional sections is obtained (step S6).

"1" is added to the counter n (step S7), the counter n and a set number N of times of measurement are compared, and the processings of step S2 through step S6 are repeated N times which is the number of times of measurement (step S8).

Through the above-described processes, positional data for each of the divisional sections set by dividing the entire stroke of the feed shaft is determined. Then, based on the determined positional data for the respective divisional sections, the amount of movement for each divisional section is determined.

Next, a third embodiment of the present invention will be described.

In the present embodiment, the displacement due to heat generated by rotation of the feed screw of the feed shaft, and the displacement due to heat generation of a feed shaft motor are considered. The computational formula for thermal displacement correction in the present embodiment is obtained by adding, to the computational formula for thermal displacement correction of the above-described second embodiment, a term of the effects of heat conduction due to heat generated in the feed shaft motor.

In the thermal displacement of the feed shaft, the displacement due to the heat generated by the rotation of the feed screw of the feed shaft is expressed by the above-described computational formula (8).

On the other hand, the effect of heat conduction due to heat generated in the feed shaft motor is greatest at the section which is adjacent to the feed shaft motor, among the respective divisional sections in the entire stroke of the feed shaft, and the effects in a section gradually decreases as the section goes away from the above-mentioned section adjacent to the feed shaft motor.

When the amount of heat generated in the feed shaft motor is small, it suffices to consider the thermal displacement for only the section which is adjacent to the feed shaft motor. Thus, if the effect of heat conduction due to heat generated in the feed shaft motor is considered for only the section adjacent to the feed shaft motor (here, this section is section 0), the thermal displacement $\delta_{n0}$ of this section can be expressed by the following formula in which a thermal displacement H due to the heat generated in the feed shaft motor is added to the above computational formula (8).

$$\delta_{n0}=\delta_{(n-1)0}+A3_{n0}-B3_{n0}+D_{n0}+H \quad (13)$$

When, among the heat generated in the feed shaft motor, the generated heat due to excitation is dominant, H in the above formula is a thermal displacement due to heat generated by the excitation of the feed shaft motor. When the machine tool is in an emergency stop state or the like and the feed shaft motor is not excited, H can be set to "0".

In the above formula (13), the displacement H is a value ignoring the effects of other factors by assuming that the amount of heat generated in the feed shaft motor is low. However, when the amount of heat generated in the feed shaft motor is high, the following formula which takes the effects of other factors into consideration is effective.

$$\delta_{n0}=\delta_{(n-1)0}+A3_{n0}-B3_{n0}+D_{n0}+H_{n-1} \quad (14)$$

wherein $$H_n=\delta_{(n-1)1}+(H_{n-1}+A4_n+B4_n)-2\delta_{(n-1)0} \quad (15)$$

Here, $A4_n$: expansion (converted value) due to heat generated in the feed shaft motor per unit time $B4_n$: contraction (converted value) due to heat radiated in the feed shaft motor per unit time For the sections other than the section which is adjacent to the feed shaft motor, the above formula (8) can be used. The thermal displacement $L_{nX}$ for each position can be expressed by the above formula (12).

Figure 8A:
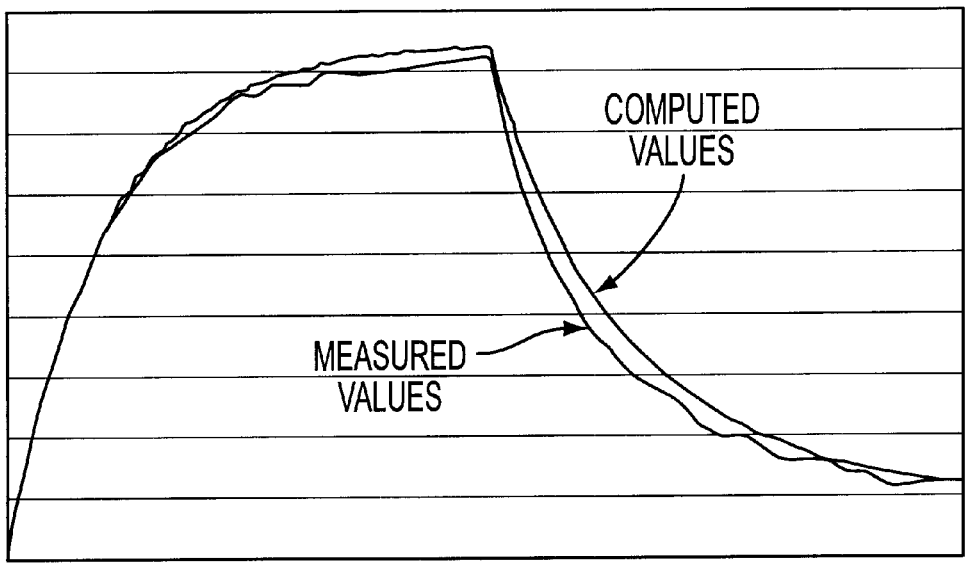
FIG. 8 is a diagram showing an example of thermal displacement correction according to a third embodiment of the present invention.
Figure 8B:
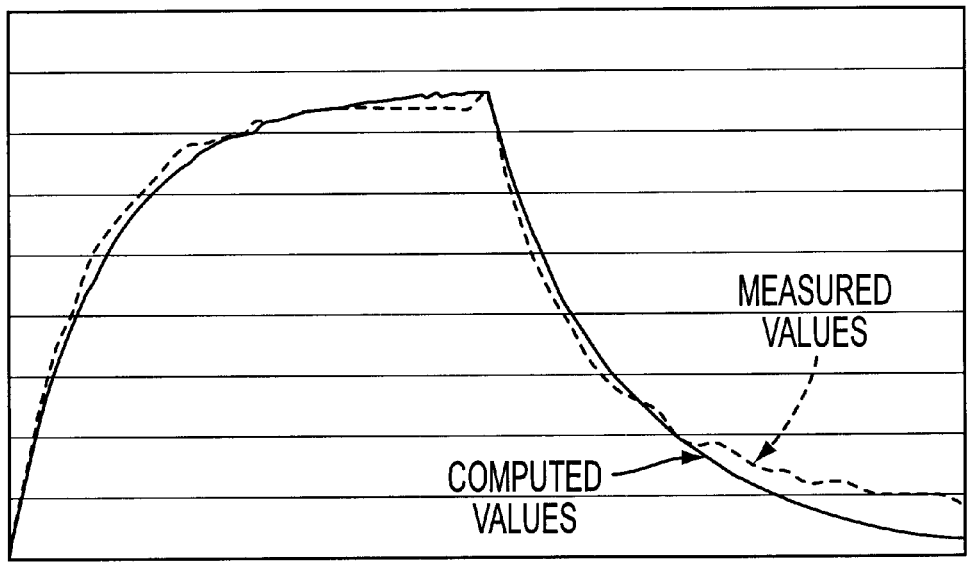

FIG. 8 compares the thermal displacement at Z=250 mm in a case where the feed shaft is actually operated at the speed of fast feed, with the results of computation of the thermal displacement obtained by using formula (12) and formula (14). In FIG. 8, (a) is a case where measurement is started immediately after the power source is turned on, while (b) is a case where measurement is started when three hours elapsed after the power source is turned on and displacement due to heat generated by excitation of the feed shaft motor has already generated. In each case, it can been seen that a substantially accurate approximation is achieved.

Next, a fourth embodiment of the present invention will be described.

In the present embodiment, the thermal displacement of the spindle in the first embodiment is considered, in addition to the thermal displacement of the feed shaft in the above-described second and third embodiments. In this way, correction is carried out for both the thermal displacement of the spindle and the thermal displacement of the feed shaft.

The thermal displacement of the spindle is expressed by the above formula (1), and the thermal displacement of the feed shaft is expressed by the above formula (12). Here, an overall thermal displacement $\Delta_{nX}$, which considers both the thermal displacement of the spindle and the thermal displacement of the feed shaft, is expressed by the following formula which is obtained by adding formula (1) and formula (12).

$$\Delta_{nX} = \delta_n + L_{nX} \qquad (16)$$

Here;

$\Delta_{nX}$: overall thermal displacement at position X $\delta_n$: thermal displacement of spindle (spindle portion thermal displacement)

Figure 9:
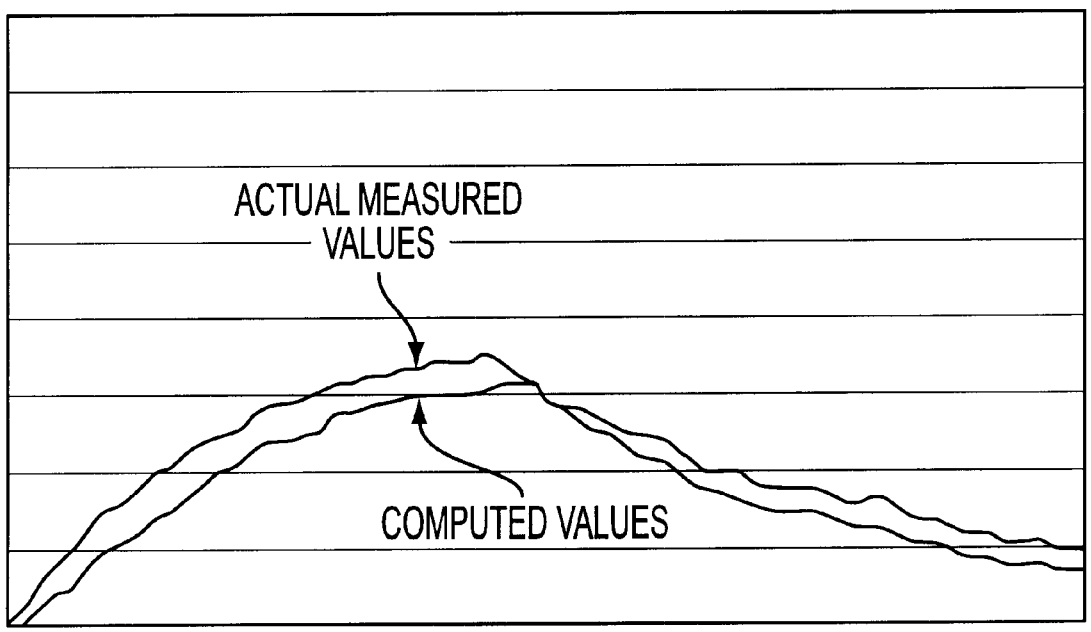
FIG. 9 is an example of thermal displacement correction according to a fourth embodiment of the present invention.

$L_{nX}$: thermal displacement of the feed shaft(feed shaft portion thermal displacement) at position X FIG. 9 compares the thermal displacement at Z=−100 mm when the spindle and the feed shaft are operated by actually carrying out drill machining and tap machining, with the results of computation of the thermal displacement by using equation (16). It can be seen from FIG. 9 that a substantially accurate approximation is achieved.

Figure 10:
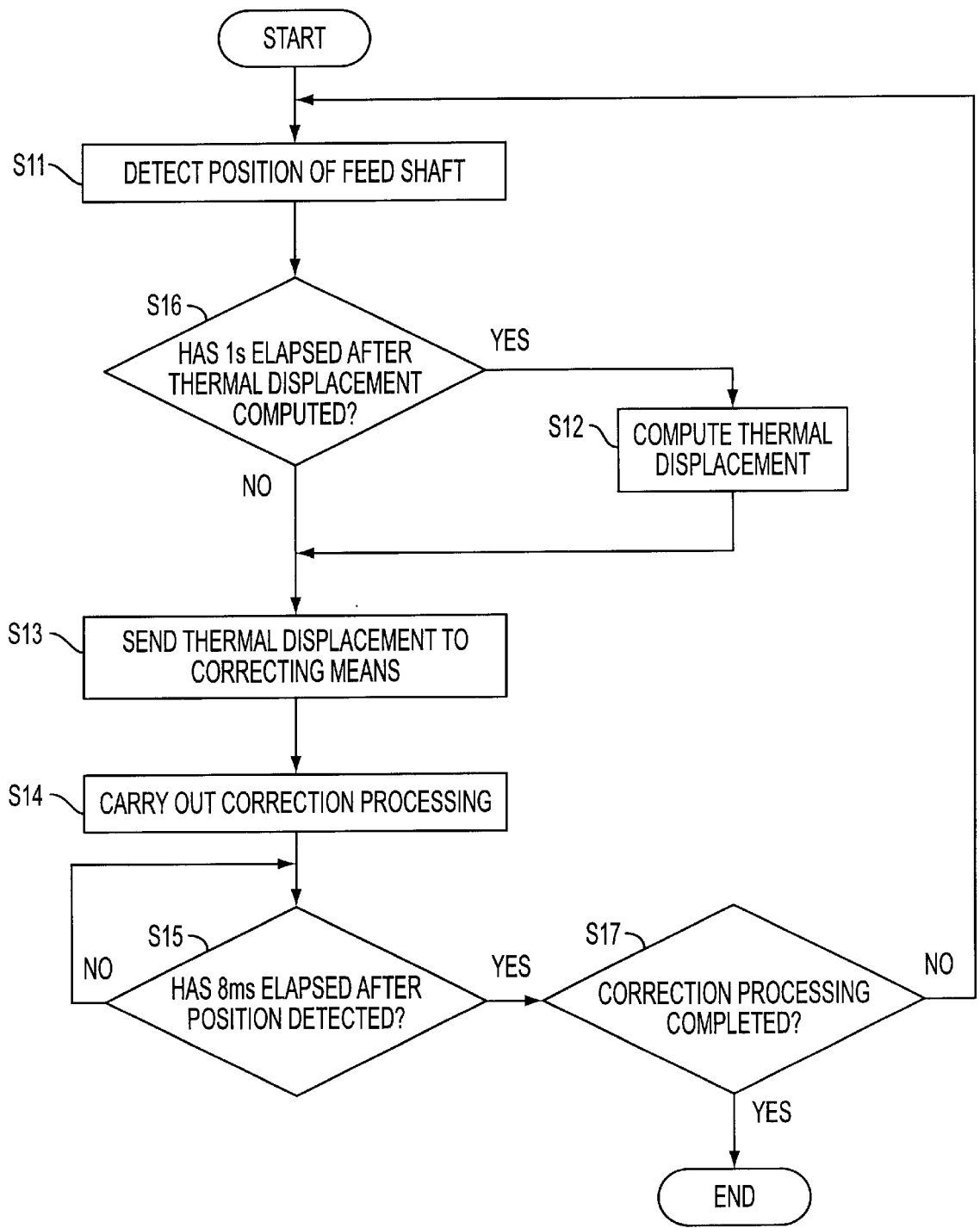
FIG. 10 is a flowchart showing processes of correction processing using a thermal displacement determined in the first through fourth embodiments.

Next, a process for correction using the thermal displacement determined in the above-described first through fourth embodiments will be described by using the flowchart of FIG. 10.

First, the position of the feed shaft is detected (step S11). From the detected positional information, the thermal displacements of all of the sections are computed for each, for example, is (second) by using the thermal displacement computational formula of the first through fourth embodiments (step S12). The thermal displacement computed at that position is sent to a correcting means (step S13), and correction is carried out based on the thermal displacement. The correction processing can be carried out by storing a correction amount corresponding to the thermal displacement in a correction amount storing means, and by a function which adjusts the reference position, for example, a function for shifting an expanded external machine origin of the machine tool (step S14).

The position detection to be carried out each 8 ms (milliseconds), for example (step S15), and the processing (step S16) for computing the thermal displacement to be carried out every 1s (second), for example, are repeated (step S17) until the correction processing is completed.

Figure 11:
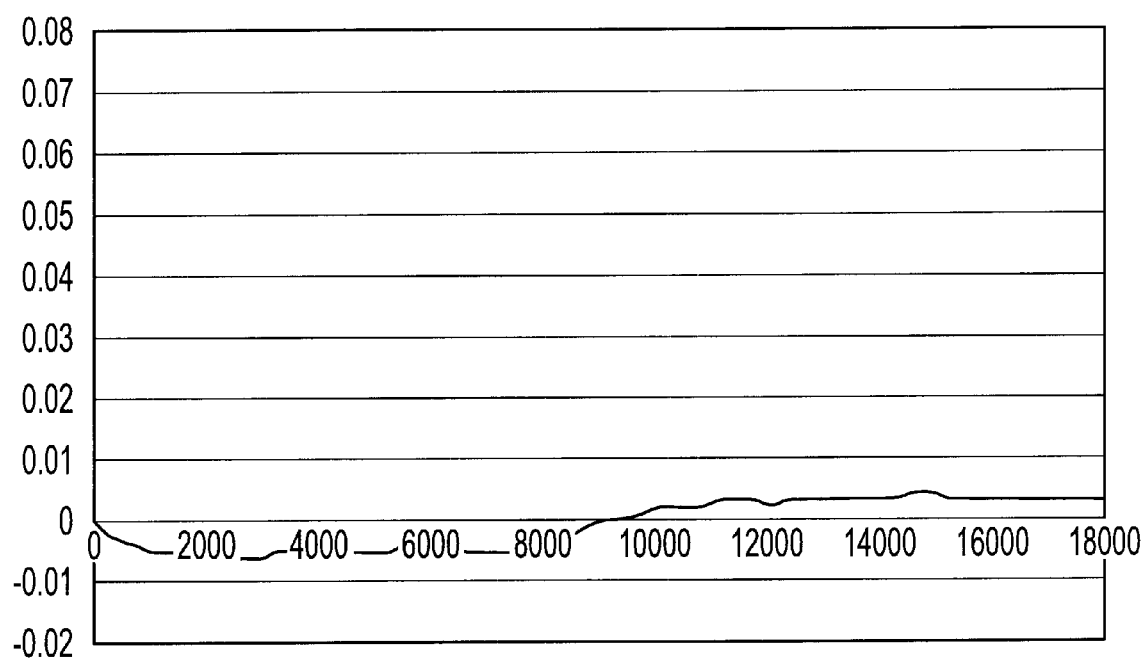
FIG. 11 is an example of actual measurement of a thermal displacement when thermal displacement correction according to the present invention is carried out.

FIG. 11 is values obtained by actually measuring thermal displacements in a case where the correction processing is carried out when drill machining and tap machining are actually carried out. It can be seen from FIG. 11 that substantially accurate correction can be achieved.

Next, an example of correcting the thermal displacement computational formula by using a correction error will be described. In the present example, the difference between the thermal displacement obtained in the above-described first through fourth embodiments and the actual thermal displacement (correction error) is reflected in a heat generation factor in the thermal displacement computational formula. By correcting the heat generation factor, more accurate thermal displacement correction is carried out.

Hereinafter, an example of processes for correcting the thermal displacement computational formula is shown. In this correction, the thermal displacement is determined by computation according to the above-described first through fourth embodiments, and the thermal displacement is determined by actual measurement. By using the determined computed value and actually measured value (correction error), the heat generation factor is corrected. Given that the heat generation factor of the spindle is A1 and the heat generation factor of the feed shaft is A3, these heat generation factors are corrected by using the ratio of the correction error to the thermal displacement obtained by computation.

In the case of the spindle, given that the ratio $(\lambda_{nX}/\delta_{nX})$ of the correction error $(\lambda_{nX})$ at time n and position X to the computed value $(\Delta_{nX})$ of the overall thermal displacement at position X is the error, and that the ratio $(\Delta_{nX}/\delta_n)$ of the computed value $(\Delta_{nX})$ of the overall displacement at position X to the computed value $(\delta_n)$ of the overall thermal displacement of the entire spindle portion is the thermal displacement determined by computation, the ratio$((\lambda_{nX}/\Delta_{nX})/(\Delta_{nX}/\delta_n))$ of the above-mentioned error to the above-mentioned thermal displacement can be determined as the ratio $\lambda_{nX}\cdot\delta_n/\Delta_{nX}^2$. The heat generation factor A1' after correction can be expressed by the following formula by using this ratio.

$$A1' = A1\cdot(1+\lambda_{nX}\cdot\delta_n/\Delta_{nX}^2) \qquad (17)$$

Further, in the case of the feed shaft, given that the ratio $(\lambda_{nX}/\Delta_{nX})$ of the correction error $(\lambda_{nX})$ at time n and position X to the computed value $(\Delta_{nX})$ of the overall thermal displacement at position X is the error, and that the ratio $(\Delta_{nX}/L_{nX})$ of the computed value $(\Delta_{nX})$ of the overall displacement at position X to the computed value $(L_{nX})$ of the overall thermal displacement of the feed shaft from the reference point at position X is the thermal displacement determined by computation, the ratio$((L_{nX}/\Delta_{nX})/(\Delta_{nX}/\delta_n))$ of the above-mentioned error and the above-mentioned thermal displacement can be determined as the ratio $\lambda_{nX}\cdot L_{nX}/\Delta_{nX}^2$.

The heat generation factor A3' after correction can be expressed by the following formula by using this ratio.

$$A3' = A1\cdot(1+\lambda_{nX}\cdot L_{nX}/\Delta_{nX}^2) \qquad (18)$$

Here;

$\lambda_{nX}$: correction error at time n and position X $\Delta_{nX}$: computed overall thermal displacement at position X $\delta_n$: computed overall thermal displacement of entire shaft portion A1: heat generation factor of the spindle A1': corrected heat generation factor of the spindle $L_{nX}$: computed thermal displacement of the feed shaft from reference point at position X A3: heat generation factor of the feed shaft A3': corrected heat generation factor of the feed shaft In the correction of the computational formula of the thermal displacement, the position X at which correction is to be carried out is inputted, and the computed thermal displacement $L_{nX}$ from the reference point of the feed shaft at position X and the computed overall thermal displacement $\delta_n$ of the entire spindle portion are stored, for example, each 10 minutes, for a three-hour period. It should be noted that the measurement interval and the measurement time can be set arbitrarily.

Next, the correction error $\lambda_{nX}$ actually measured at time n and position X, and the stored $L_{nX}$ and $\delta_n$ are inputted, and the corrected heat generation factors of the spindle and the feed shaft are computed by using equations (17) and (18).

Figure 12A:
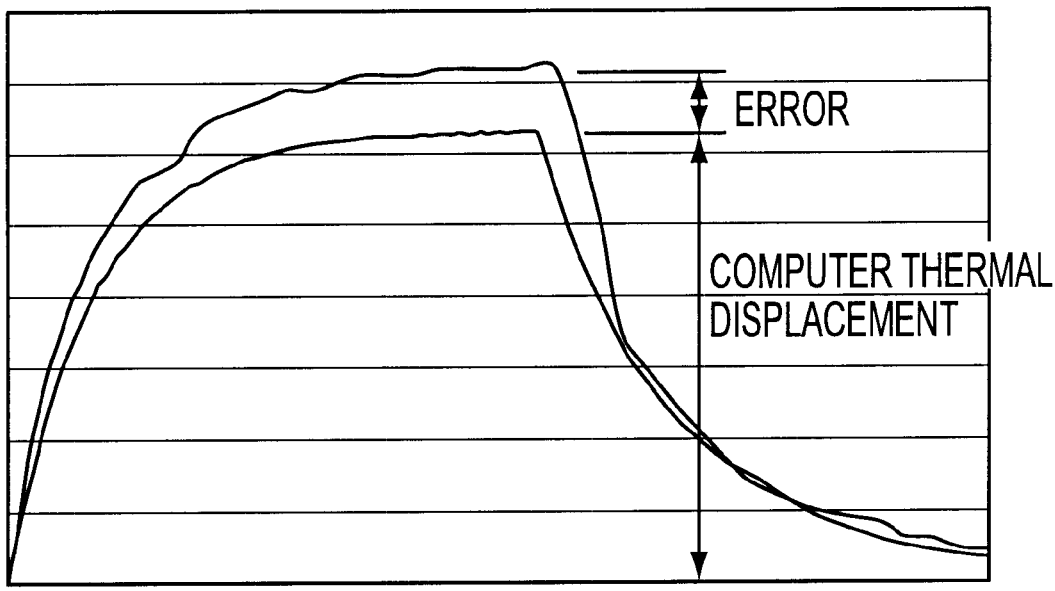
FIG. 12 is a diagram showing results of modification of a heat generation factor based on a correction error.
Figure 12B:
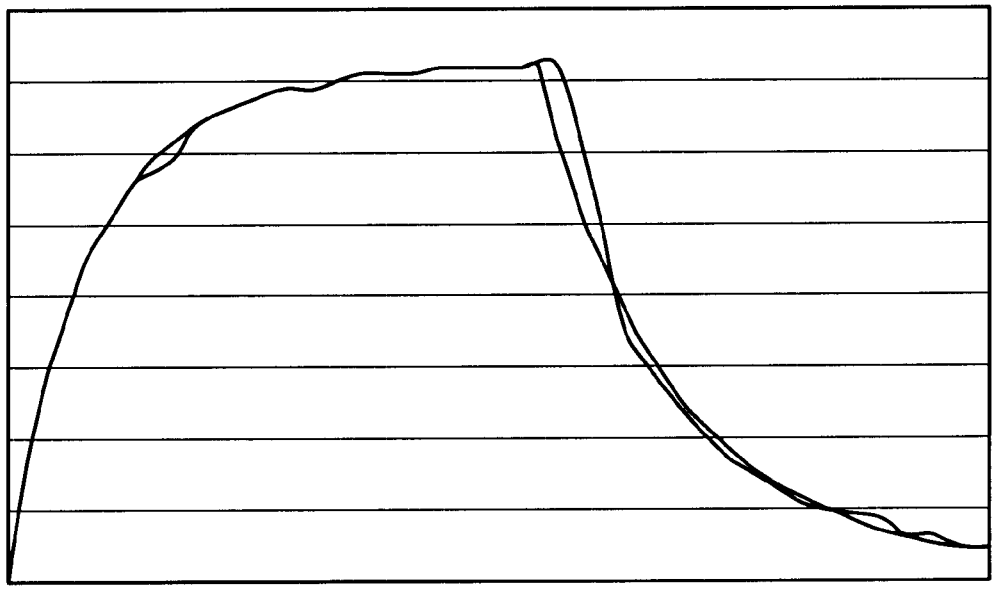

FIG. 12 is a diagram showing results of correction of the heat generation factors based on correction errors. In FIG. 12, (a) shows the state before correction, while (b) shows the state after correction.

In FIG. 12, (a) shows the actual displacements in a case where drill machining and tap machining are carried out and the thermal displacements determined by computation are shown, and the difference therebetween shows the correction error, while (b) shows a case where the corrected heat generation factors determined based on the correction errors are used, and it can be seen that the error is substantially eliminated by correction.

According to this example of correcting the heat generation factor, the actual amount of offset can be fed-back to the thermal displacement computational formula. Thus, appropriate correction for each case can be carried out.

What is claimed is:

1. A method of correcting thermal displacement of a machine tool, comprising:

detecting a speed of a spindle of a machine tool and a load of a spindle motor which drives the spindle;

determining an average spindle speed and an average spindle motor load based on the speed of the spindle and the load of the spindle motor;

determining an amount of thermal displacement of a spindle portion based on the average spindle speed and the average spindle motor load; and correcting a position instruction value for a feed shaft of the machine tool based on a correction amount, the correction amount being equivalent to an amount canceling the amount of thermal displacement of the spindle portion.

2. The method of correcting thermal displacement of a machine tool according to claim 1, wherein the thermal displacement of the spindle portion includes a thermal displacement due to heat radiation and/or heat conduction by the machine tool.

3. The method of correcting thermal displacement of a machine tool according to claim 1, wherein a thermal displacement of a spindle computational formula, in which the spindle speed and the spindle motor load are parameters, is prepared, and the thermal displacement of a spindle is determined by applying the average spindle speed and the average spindle motor load to the thermal displacement of a spindle computational formula.

4. The method of correcting thermal displacement of a machine tool according to claim 1, wherein a thermal displacement of a spindle computational formula, in which the spindle speed and the spindle motor load are parameters, is prepared, and the thermal displacement of a spindle is determined by applying the average spindle speed and the average spindle motor load to the thermal displacement of a spindle computational formula, and a heat generation factor in the thermal displacement computational formula is corrected based on an error between a thermal displacement and an actual displacement of a tool.

5. The method of correcting thermal displacement of a machine tool according to claim 1, wherein a range of movement of the feed shaft is divided such that sections are set, and a position for each section of the feed shaft is detected, an average moving speed at each section is determined based on the detected positions, a thermal displacement at each section is determined based on the determined average moving speed, the thermal displacement of each section from a reference position to a correction position is added, and the sum is used as a feed shaft portion thermal displacement, the spindle portion thermal displacement is added to the feed shaft portion thermal displacement, and the sum is used as an overall thermal displacement at the correction position, and an amount which cancels the overall thermal displacement is used as a correction amount, and, in movement to the correction position of the feed shaft, correction is carried out by adding the correction amount to the position instruction value of the feed shaft.

6. The method of correcting thermal displacement of a machine tool according to claim 5, wherein the thermal displacement of the section includes a thermal displacement due to heat radiation at that section and thermal conduction between that section and a section adjacent that section.

7. The method of correcting thermal displacement of a machine tool according to claim 5, wherein the feed shaft portion thermal displacement includes a displacement due to heat generation of a feed screw portion and a thermal displacement due to heat generation of a feed shaft motor.

8. The method of correcting thermal displacement of a machine tool according to claim 1, wherein a feed shaft thermal displacement computational formula, in which a moving speed at a divisional section is a parameter, is prepared, and a thermal displacement of each section is determined by applying an average moving speed of each section to the feed shaft thermal displacement computational formula.

9. The method of correcting thermal displacement of a machine tool according to claim 1, wherein a feed shaft thermal displacement computational formula, in which a moving speed at a divisional section is a parameter, is prepared, and a thermal displacement of each section is determined by applying an average moving speed of each section to the feed shaft thermal displacement computational formula, and a heat generation factor in the thermal displacement computational formula is corrected based on an error between a thermal displacement and an actual displacement of a tool.

10. A machine tool comprising:

spindle speed detecting means for detecting a speed of a spindle;

spindle motor load detecting means for detecting a load of a spindle motor;

spindle portion thermal displacement computing means for determining a thermal displacement of a spindle portion based on an average spindle speed detected by the spindle speed detecting means and an average spindle motor load detected by the spindle motor load detecting means; and position instruction correcting means for correcting a position instruction of a feed shaft of the machine tool by a value based on the thermal displacement determined by the spindle portion thermal displacement computing means.

* * * * *